United States Patent
Liu et al.

(10) Patent No.: US 9,533,834 B1
(45) Date of Patent: Jan. 3, 2017

(54) PUSHER SYSTEM FOR A STRAPPING MACHINE

(71) Applicants: TEKPAK CORPORATION, Taichung (TW); TRANSPAK EQUIPMENT CORPORATION, Taipei (TW)

(72) Inventors: Chin-Chang Liu, Taichung (TW); Chi-Jan Su, Taipei (TW)

(73) Assignees: TEKPAK CORPORATION, Taichung (TW); TRANSPAK EQUIPMENT CORPORATION, Taipei (TW)

( * ) Notice: Subject to any disclaimer, the term of this patent is extended or adjusted under 35 U.S.C. 154(b) by 0 days.

(21) Appl. No.: 14/797,175

(22) Filed: Jul. 12, 2015

(51) Int. Cl.
  *B65G 15/00* (2006.01)
  *B65G 43/08* (2006.01)
  *B65G 25/08* (2006.01)
  *B65G 13/00* (2006.01)

(52) U.S. Cl.
  CPC ............. *B65G 43/08* (2013.01); *B65G 13/00* (2013.01); *B65G 25/08* (2013.01); *B65G 2811/0673* (2013.01)

(58) Field of Classification Search
  CPC .. B65G 13/00; B65G 25/08; B65G 2811/0673
  USPC .............. 198/413, 468.6, 468.8, 717
  See application file for complete search history.

(56) References Cited

U.S. PATENT DOCUMENTS 4,178,118 A * 12/1979 Bailey .................... B65H 31/40
                                                                    193/35 SS
6,948,430 B1 * 9/2005 Montbleau ............... B65H 5/04
                                                                    101/477

* cited by examiner

*Primary Examiner* — Gene Crawford
*Assistant Examiner* — Lester Rushin
(74) *Attorney, Agent, or Firm* — Cheng-Ju Chiang

(57) ABSTRACT

The present invention includes a housing, multiple conveyors, and a driving system. The conveyors are provided for a working object to be moved on the conveyors. The driving system has a horizontal moving portion and a vertical moving portion. As the horizontal moving portion moves from the second position toward the first position, when a first detector detects a rear edge of the working object, a controller is able to stop the horizontal moving portion and to set an actual pushing position. Then, it can reset that the horizontal only can move between the actual pushing position and the second position for shortening a moving time and a moving distance of the horizontal moving portion. So, this invention can shorten the horizontal moving time of the horizontal moving portion. It can shorten the vertical moving time. Plus, it can increase the total processing efficiency.

2 Claims, 8 Drawing Sheets

PUSHER SYSTEM FOR A STRAPPING MACHINE

BACKGROUND OF THE INVENTION

1. Field of the Invention

This invention relates to a pusher system for a strapping machine. It can shorten the horizontal moving time of the horizontal moving portion. It can shorten the vertical moving time. Plus, it can increase the total processing efficiency.

2. Description of Related Art

Referring to FIGS. 11, 12, 13, 14, and 15, a traditional pusher system for a strapping machine is disclosed. It includes a housing 81, a pair of conveyors 82, and a driving system 83.

About the housing 81, it has a first end 811, a second end 812, and a guiding channel 813. The guiding channel 813 is disposed between the first end 811 and the second end 812.

With regard to the pair of conveyors 82 (or called transport devices), they are disposed on the housing 81. The guiding channel 813 is positioned between the conveyors 82 for allowing a working object 90 (such as a box or a stack to be strapped) to be moved on the conveyors 82 horizontally.

Concerning the driving system 83, it is disposed in the housing 81 and is positioned corresponding to the guiding channel 813. The driving system 83 has a horizontal moving portion 831 and a vertical moving portion 832. The horizontal moving portion 831 is able to move beneath the guiding channel 813 and move between a first position P1 and a second position P2 (see FIG. 16) horizontally. The vertical moving portion 832 is mounted on the horizontal moving portion 831 and can move up or down. The vertical moving portion 832 includes a pusher 83A for pushing the working object 90 moving forward. When it is at an upper position P4, the pusher 83A can protrude in the guiding channel 813 for pushing the working object 90.

As illustrated in FIG. 12, the working object 90 moves in a place on the conveyors 82 via the first end 811 (automatically or manually). Then, the working object 90 is pushed by the pusher 83A to move in a strapping machine 90A via the second end 812 so as to conduct a strapping work.

Referring to FIG. 13, the horizontal moving portion 831 is positioned at the first position P1. The pusher 83A is positioned at the lower position P3. The working object 90 moves on the conveyors 82. The pusher 83A moves up to the upper position P4 (as shown in FIG. 14). Then, the horizontal moving portion 831 moves from the first position P1 to the second position P2 (referring to FIGS. 15 and 16). Initially, the pusher 83A moves certain distance without contacting anything (from FIG. 14 to FIG. 15). Later, the pusher 83A will contact with the working object 90. After which, the pusher 83A continues to push the working object 90 to the strapping machine 90A (see FIG. 16).

As illustrated in FIG. 17, the pusher 83A returns to its lower position P3, and then the horizontal moving portion 831 returns to the first position P1 so that a complete cycle is done.

However, the traditional pusher system for a strapping machine still has many problems and disadvantages as listed below.

[a] The horizontal moving portion only can move back and forth for a fixed distance. The horizontal moving portion only can move between the first position and the second position. It is a fixed stroke (or distance). It cannot be stopped in the middle. For example, if the original design for the horizontal moving portion's moving distance is 1.5 m. The horizontal moving portion only can move forward 1.5 m toward the first end or move back 1.5 m toward the second end.

Therefore, no matter the length of the working object is long or short (such as 30 cm, 100 cm, etc.), the moving distance of 1.5 m is fixed. When the working object is a smaller one, it will cause certain invalid pushing process (that means the pusher does not contact with the working object). It really wastes time. Thus, the horizontal moving distance of the traditional device's horizontal moving portion cannot be adjusted. It is not flexible.

[b] The vertical moving portion only can move up or down for a fixed height. The traditional pusher system only can move up or down between the upper position and the lower position. It cannot stop in the middle. For example, assuming that the original vertical moving distance is designed as 50 cm, the traditional pusher system only can move up 50 cm (directly to the upper position) or move down 50 cm (directly to the lower position).

Under such condition, no matter the working object is larger or smaller (such 25 cm height, 45 cm height, etc.). The vertical moving distance is always fixed as 50 cm. Therefore, when the height of the working object is smaller, the extra moving process (up or down) wastes time. Therefore, the vertical moving distance of the traditional pusher system cannot be adjusted as well.

SUMMARY OF THE INVENTION

The object of the present invention is to provide a pusher system for a strapping machine with the advantages listed as follows. It can shorten the horizontal moving time of the horizontal moving portion. It can shorten the vertical moving time. It can increase the total processing efficiency. Particularly, this invention solves the problem that the horizontal moving distance and vertical moving distance cannot be adjusted.

A pusher system for a strapping machine is provided. It comprising:

a housing having a first end, a second end, and a guiding channel, the guiding channel is disposed between the first end and the second end;

a pair of conveyors disposed on the housing, the guiding channel being positioned between the conveyors for allowing a working object to be moved on the conveyors; the working object having a bottom that has a front edge and a rear edge, a length of the working object being defined between the front edge and the rear edge; and a driving system being disposed in the housing and positioned corresponding to the guiding channel, the driving system having a horizontal moving portion and a vertical moving portion, the horizontal moving portion being able to move between a first position and a second position horizontally, the vertical moving portion being mounted on the horizontal moving portion and is able to move up or down, the vertical moving portion including a pusher for pushing the working object moving forward;

wherein the pusher system for a strapping machine further comprising a first detector and a controller; the first detector being disposed on a top surface of the pusher and the first detector connecting with the controller electrically;

so that as the horizontal moving portion moves from the second position toward the first position, when the first detector detects the rear edge of the working object, the controller is able to stop the horizontal moving portion and to set an actual pushing position; so as to reset that the horizontal moving portion only can move between the actual pushing position and the second position for shortening a moving time and a moving distance of the horizontal moving portion.

DETAILED DESCRIPTION OF THE INVENTION

Figure 1:
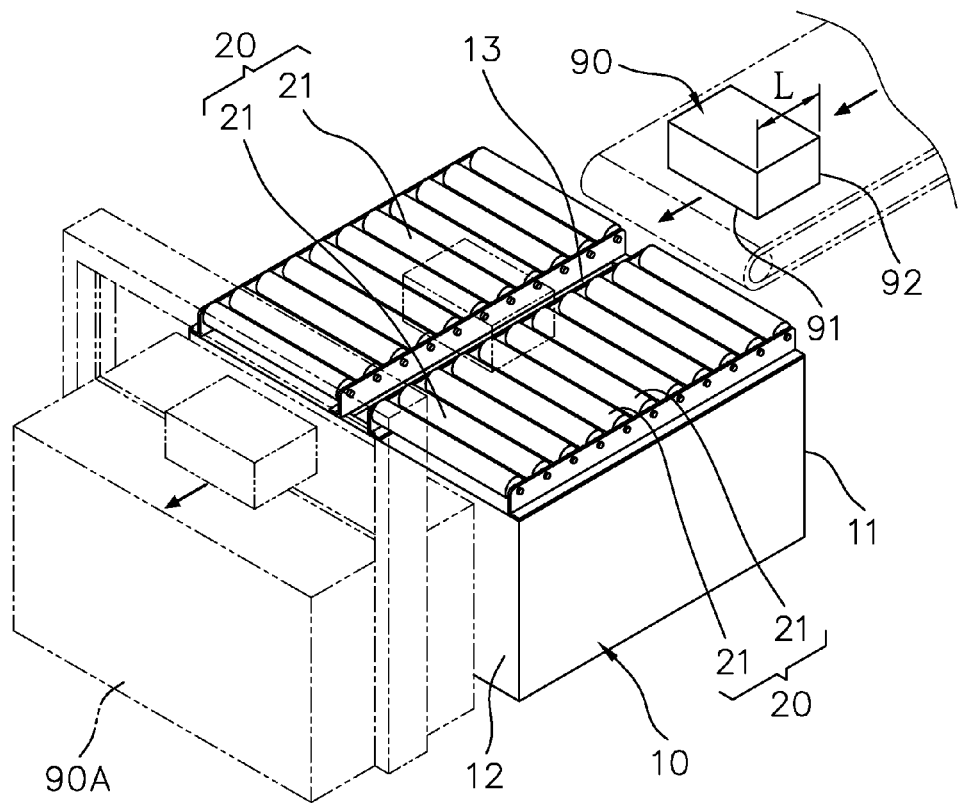
FIG. 1 is a perspective view of the present invention.

Referring to FIGS. 1, 2, 3, and 4, the present invention is a pusher system for a strapping machine. It mainly comprises a housing 10, a pair of conveyors 20, and a driving system 30.

About the housing 10, it has a first end 11, a second end 12, and a guiding channel 13. The guiding channel 13 is disposed between the first end 11 and the second end 12.

With regard to the pair of conveyors 20, they are disposed on the housing 10. The guiding channel 13 is positioned between the conveyors 20 for allowing a working object 90 to be moved on the conveyors 20. The working object 90 has a bottom that has a front edge 91 and a rear edge 92. A length L of the working object is defined between the front edge 91 and the rear edge 92.

Figure 9:
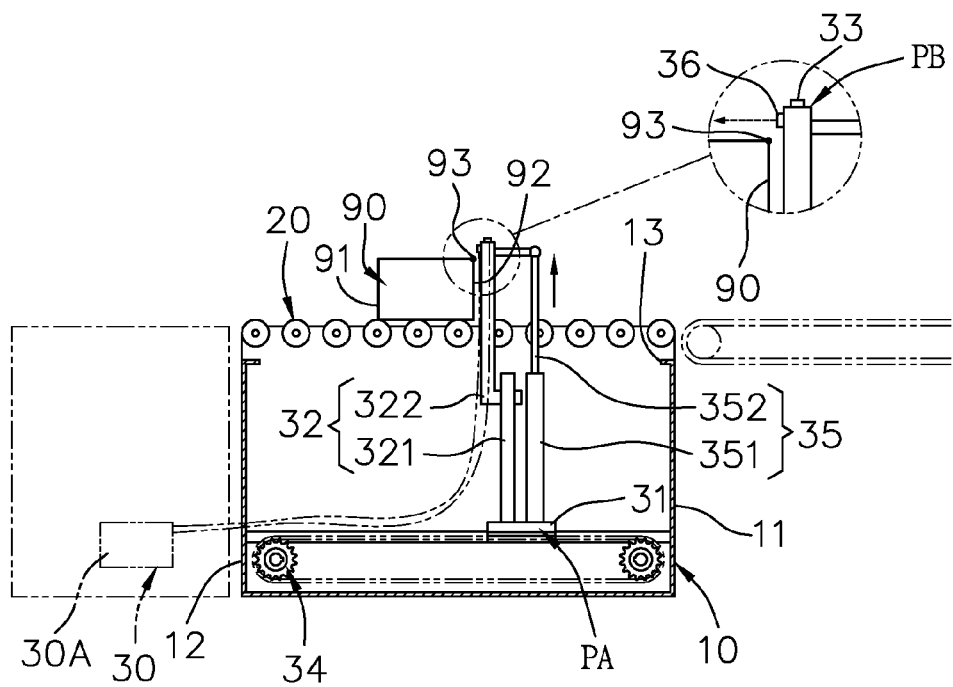
FIG. 9 is a view showing that the move-up position is set.
Figure 10:
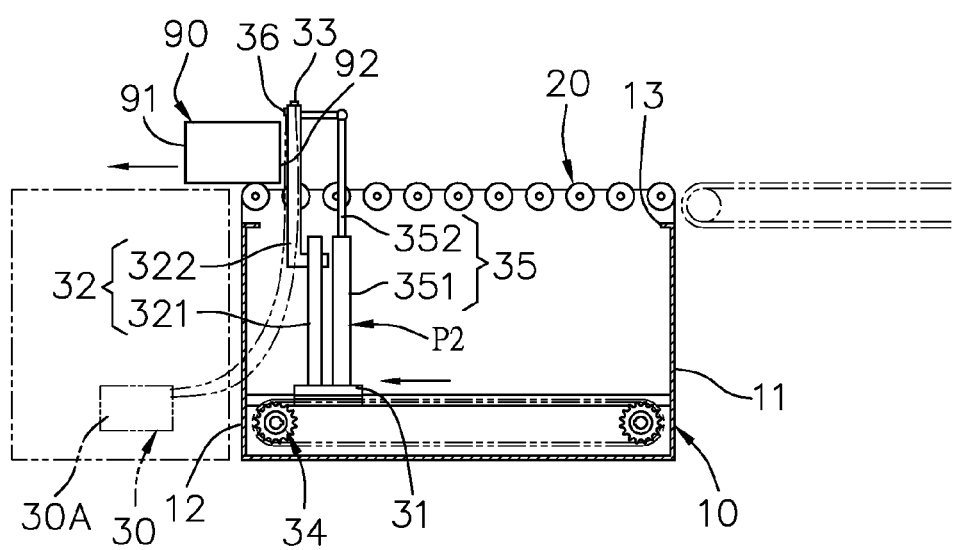
FIG. 10 a view showing that the pusher pushes the working object forward.
Figure 11:
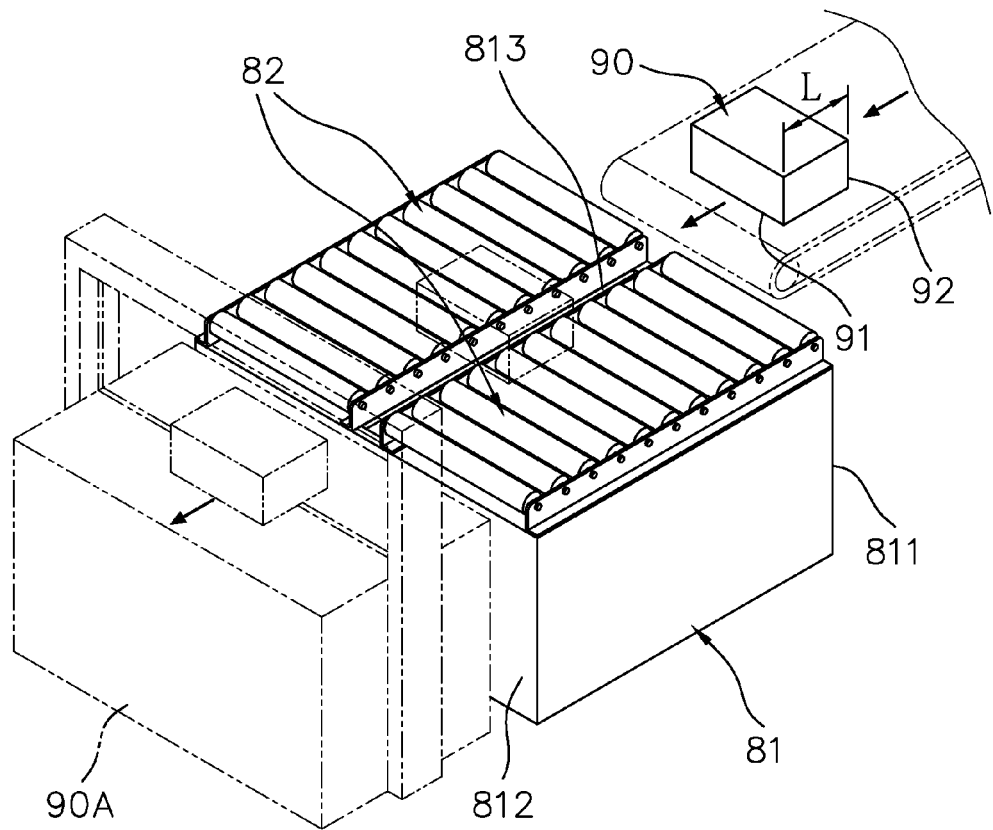
FIG. 11 is perspective view of the traditional device.
Figure 12:
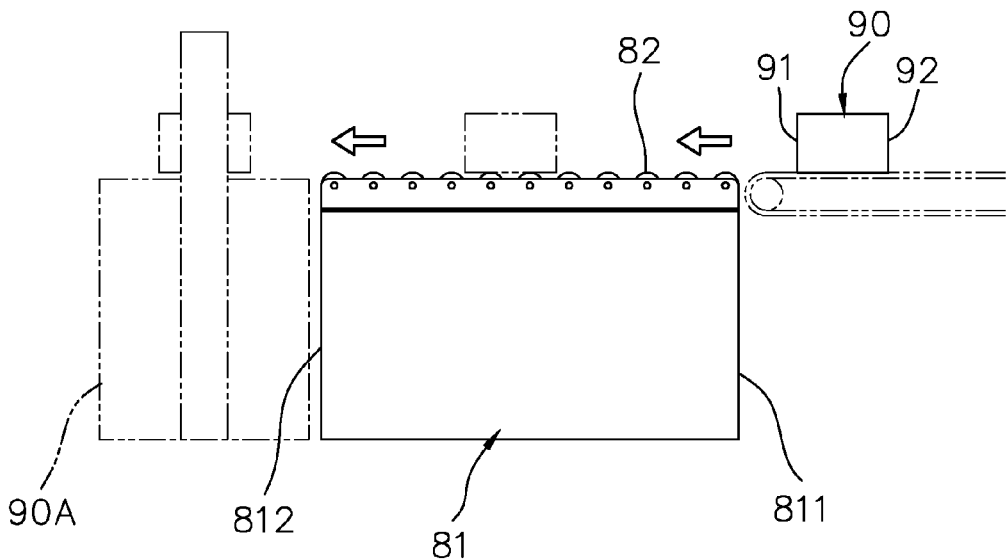
FIG. 12 is a side view of the traditional device.
Figure 13:
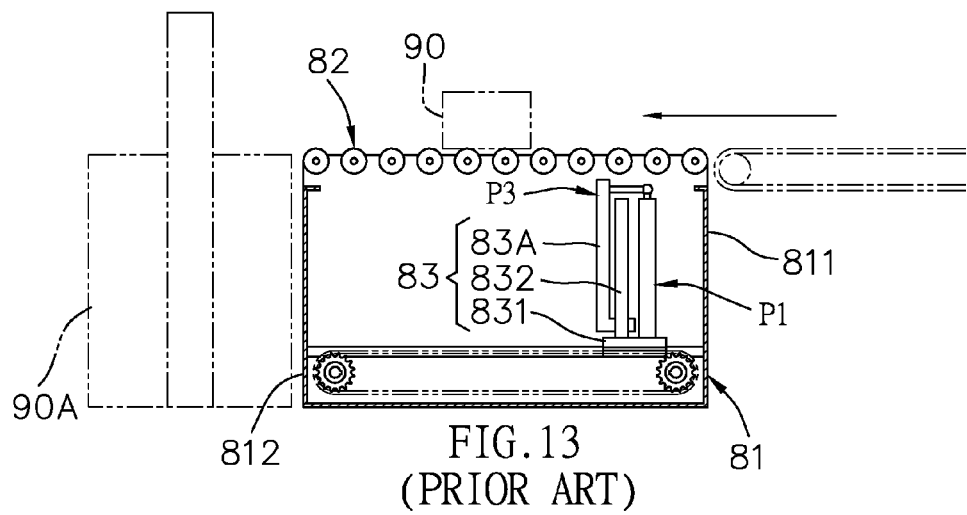
FIG. 13 is a view showing that the horizontal moving portion of the traditional device moves to the first position and the pusher is lowered.
Figure 14:
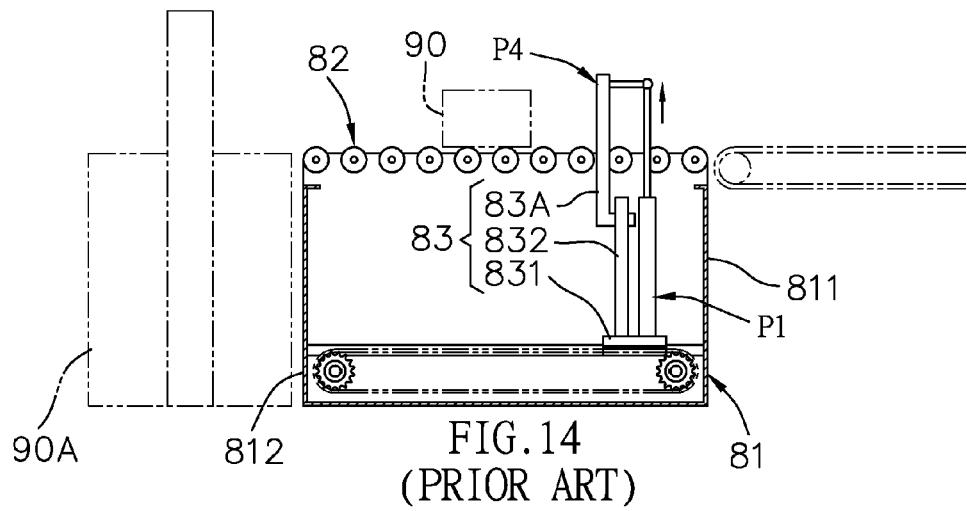
FIG. 14 is a view showing that the pusher of the traditional device moves up to the upper position.
Figure 15:
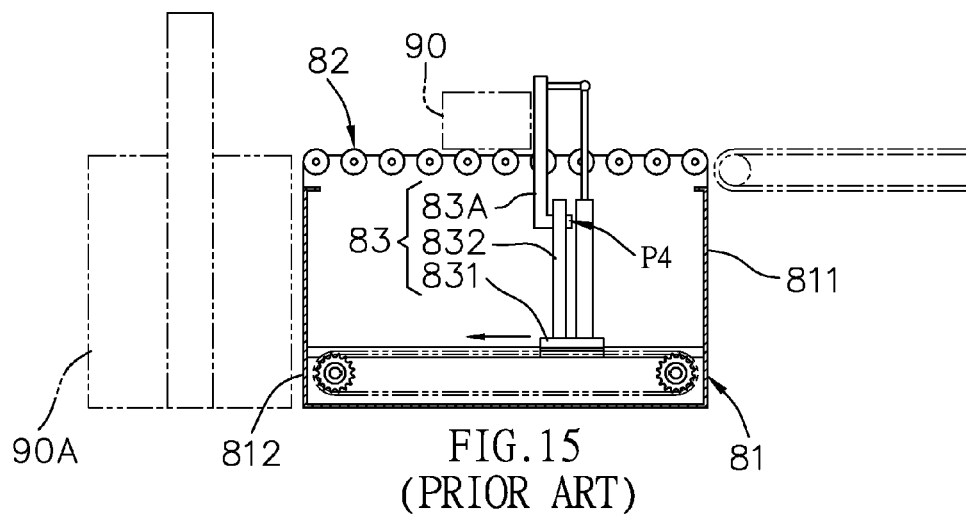
FIG. 15 a view showing that the pusher of the traditional device pushes the working object.
Figure 16:
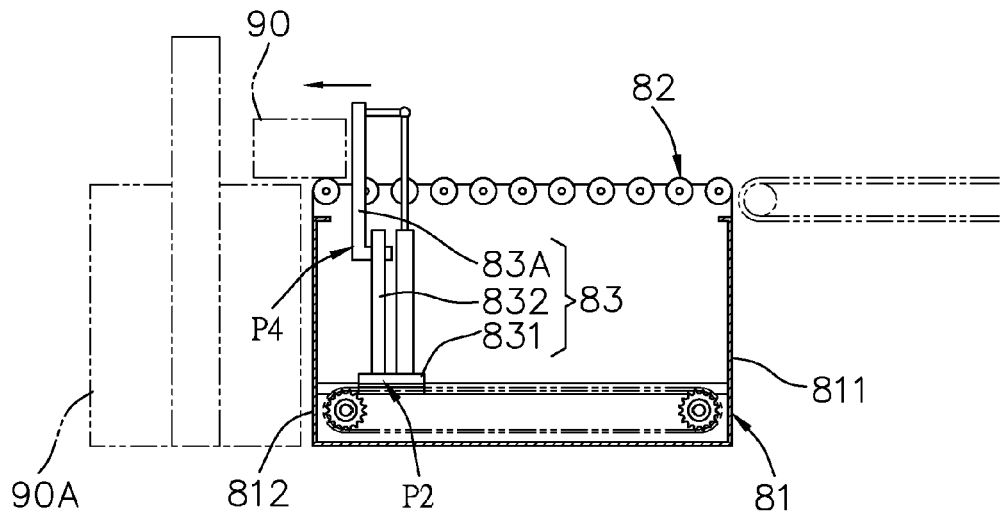
FIG. 16 is a view showing that working object has been pushed to the second end and the horizontal moving portion of the traditional device moves to the second position.
Figure 17:
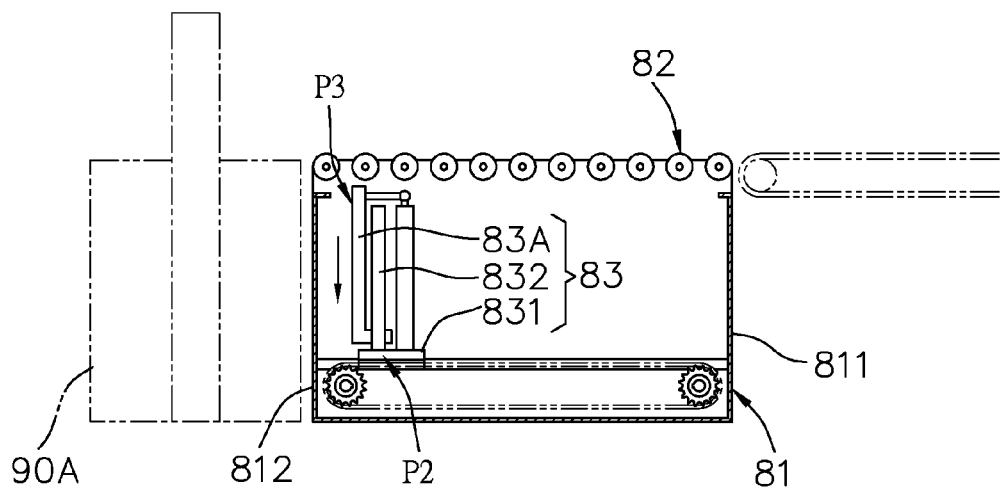
FIG. 17 is a view showing that the pusher of the traditional device moves down to the lower position.

Concerning the driving system 30, it is disposed in the housing 10 and positioned corresponding to the guiding channel 13. The driving system 30 has a horizontal moving portion 31 and a vertical moving portion 32. The horizontal moving portion 31 is able to move beneath the guiding channel 13 and move between a first position P1 and a second position P2 (see FIG. 10) horizontally. The vertical moving portion 32 is mounted on the horizontal moving portion 31 and can move up (to an upper position P4 shown in FIG. 4) and down. The vertical moving portion 32 includes a pusher 322 for pushing the working object 90 moving forward (as shown in FIG. 9, moving up to an actual move-up position PB and then to push the working object 90);

This invention further includes the following improvements as described below.

The driving system 30 further comprises a first detector 33 and a controller 30A. The first detector 33 is disposed on a top surface of the pusher 322 and the first detector 33 connects with the controller 30A electrically.

Therefore, the horizontal moving portion 31 moves from the second position P2 to the first position P1. When the first detector 33 detects the rear edge 92 of the working object 90 (through the guiding channel 13), the controller 30A is able to stop the horizontal moving portion 31 and to set an actual pushing position PA. Hence, it can reset that the horizontal moving portion 31 only moves between the actual pushing position PA and the second position P2 for shortening a moving time and a moving distance of the horizontal moving portion 31.

Practically, each conveyor 20 may include multiple rollers 21 that are pivoted on the housing 10 for conveying forward (along the direction of the guiding channel 13).

Figure 3:
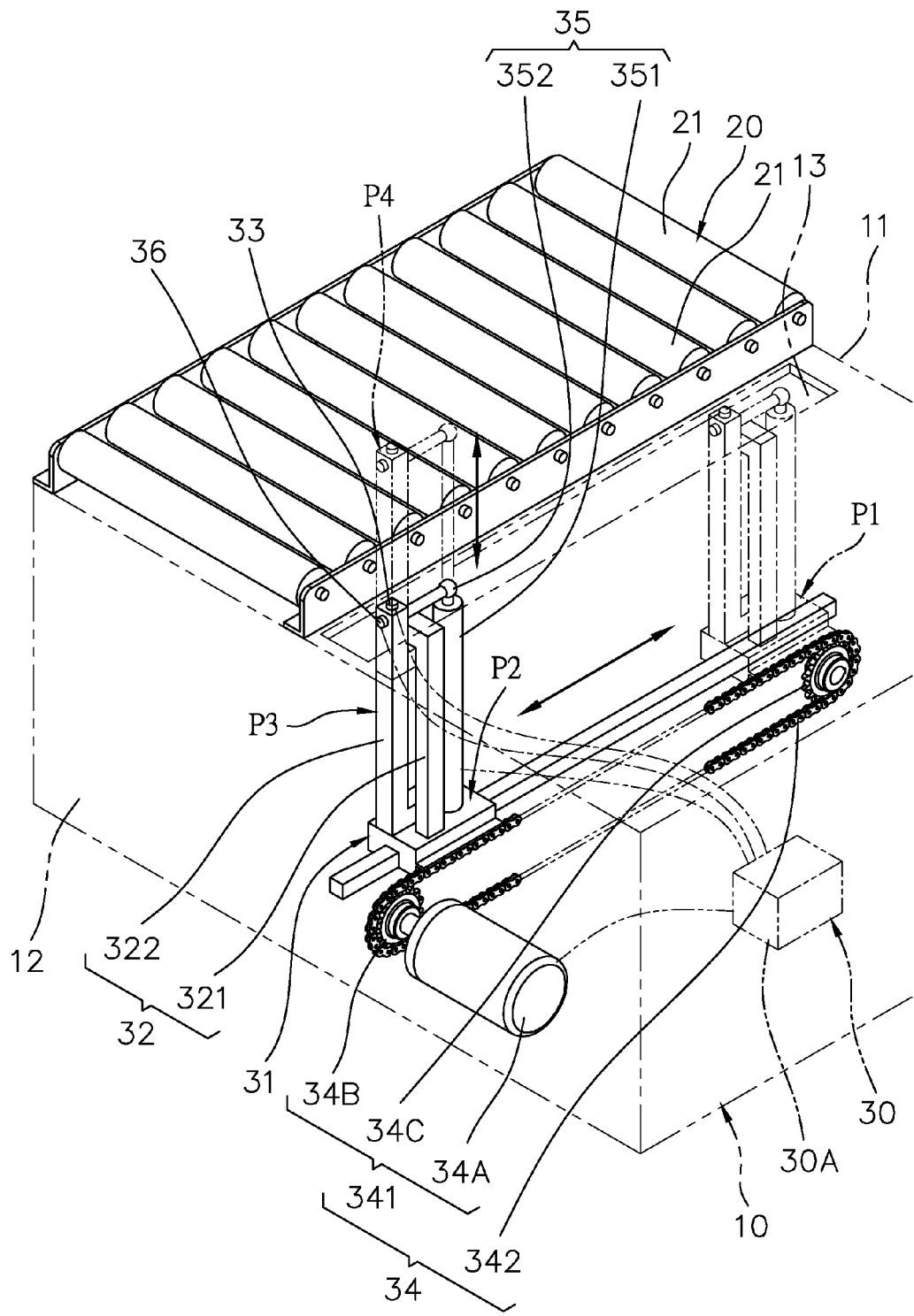
FIG. 3 is perspective view showing main structure of this invention.

Referring to FIG. 3, about the driving system 30, the vertical moving portion 32 includes a vertical rail 321 and the pusher 322. The pusher 322 can move up or down along the vertical rail 321.

The driving system 30 further comprises a horizontal driving portion 34 and a vertical driving portion 35.

The horizontal driving portion 34 includes a horizontal power device 341 and a chain 342.

The horizontal power device 341 has a motor 34A, a power chain gear 34B, and an auxiliary chain gear 34C. The motor 34A connects with the controller electrically and can drive the power chain gear 34B.

This chain 342 is disposed on the power chain gear 34B and the auxiliary chain gear 34C. The horizontal moving portion 31 is secured on the chain 342.

Hence, the controller 30A can control the motor 34A to drive the chain 342 moving and make the horizontal moving portion 31 being movable among the first position P1, the second position P2 and the actual position P3.

The vertical driving portion 35 includes a power cylinder 351 and a protruding rod 352.

The power cylinder 351 connects with the controller 30A electrically. The protruding rod 352 has two ends. In which, one end of the protruding rod 352 is disposed inside the power cylinder 351. The other end of the protruding rod 352 is connected with the pusher 322.

So, the controller 30A can control the power cylinder 351 to make the protruding rod 352 in or out so as to make the pusher 322 moving up or down on the horizontal moving portion 31.

The firs preferred embodiment of the present invention is described above.

Furthermore, the driving system 30 may further comprise a second detector 36 to form the second preferred embodiment of this invention.

The second detector 36 connects with the controller 30A electrically. It is disposed on the pusher 322. The second detector 36 is able to detect a direction toward the working object 90 and is secured on the pusher 322 (preferably near the top surface of the pusher 322).

Figure 7:
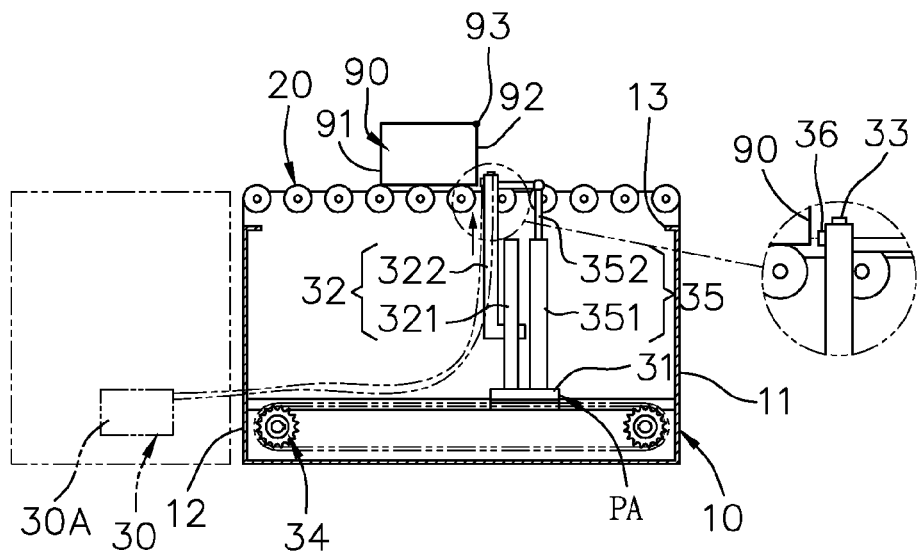
FIG. 7 is a view showing that the pusher begins to move up.

The working object 90 has a highest point 93 (as shown in FIG. 7).

Figure 6:
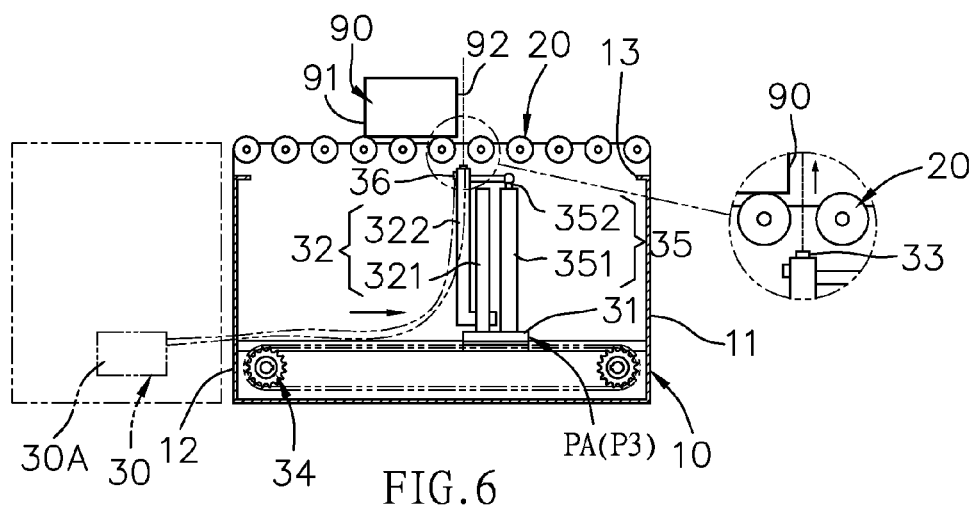
FIG. 6 is a view showing that the actual pushing position is set.
Figure 8:
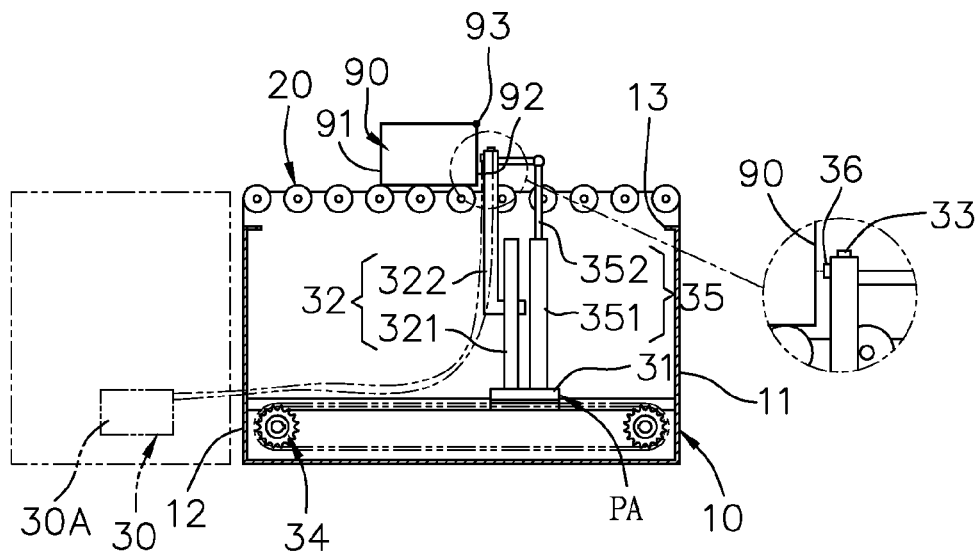
FIG. 8 is a view showing that detecting process while moving up.

Hence, the horizontal moving portion 31 moves to the actual pushing position PA. During a move-up process of the pusher 322 from a lower position P3 (referring to FIGS. 6, 7, and 8), when the second detect 36 detects that it moves just above the highest point 93 of the working object 90, the controller 30A will to stop the pusher 322. And, an actual move-up position PB (see FIG. 9) is obtained and is set. Thus, it will reset that the pusher 322 only can move between the lower position P3 and the actual move-up position PB for shortening a moving time and a moving distance of the pusher 322.

Regarding the operation of this invention, it has two modes.

Figure 2:
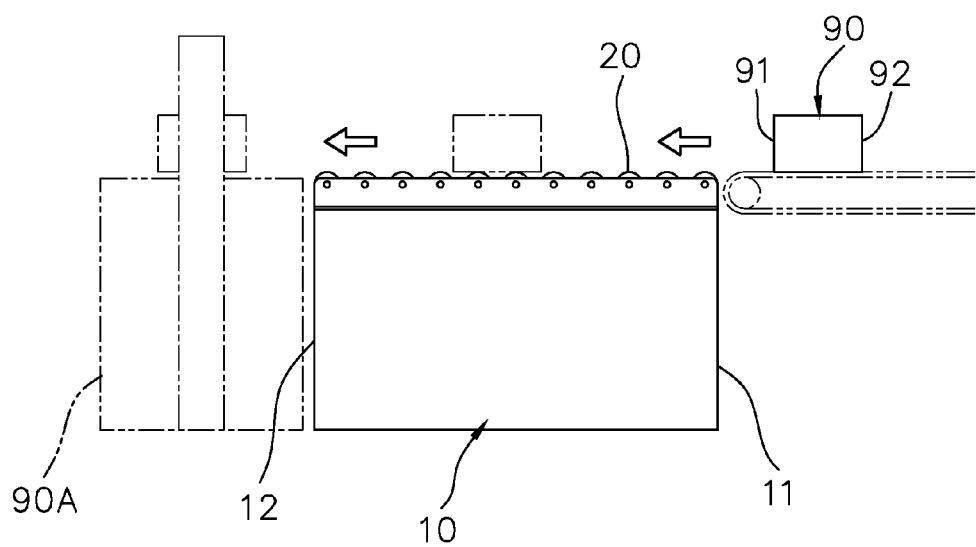
FIG. 2 is a side view of the present invention.
Figure 4:
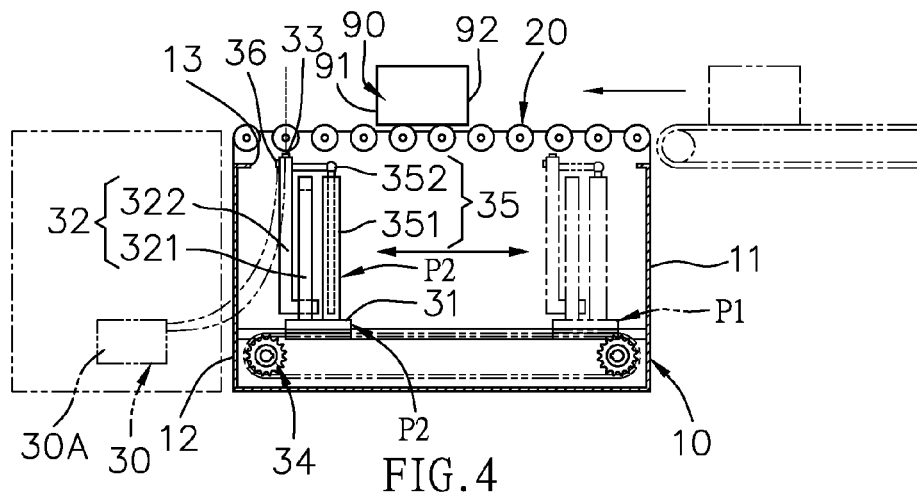
FIG. 4 is a view showing the movement of horizontal moving portion of this invention.
Figure 5:
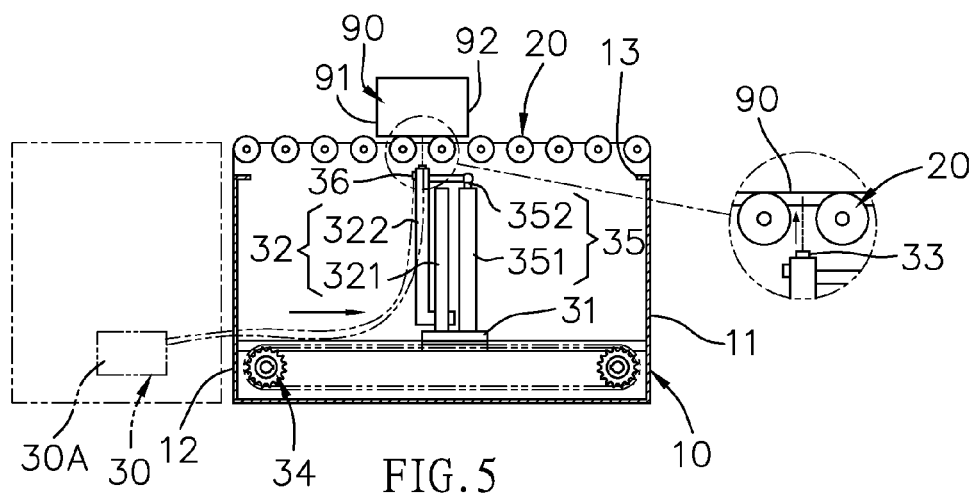
FIG. 5 is a view showing the detecting process of this invention.

[a] The horizontal moving adjustment mode. About this mode, only the first detector 33 is required. The operation process contains the following steps. The working object 90 moves on the conveyors 20 (as shown in FIGS. 1 and 2). The horizontal moving portion 31 is movable between the first position P1 and the second position P2 (as shown in FIG. 4). The first detector 33 detects the working object 90 (from the front edge 91 to the rear edge 92) via the guiding channel 13 (see FIGS. 5 and 6). The first detector 33 detects the rear edge 92, so the controller 30A stops the horizontal moving portion 31. This position will be set as the actual pushing position PA. After such setting, the horizontal moving portion 31 only can move between the actual pushing position PA and the second position P2.

Therefore, this invention can shorten the horizontal moving distance and time, depending on the length L of every working object 90.

[b] The vertical moving adjustment mode. The second detector 36 must be added. First, the horizontal moving portion 31 moves to the actual pushing position PA (also it is the lower position P3). The pusher 322 will move up from the lower position P3 to the upper position P4. The second detector 36 detects the working object 90 (see FIGS. 7 and 8). When the second detector 36 detects the highest point 93 (as shown in FIG. 9), the controller 30A stops the pusher 322. This position will be set as the actual move-up position PB. After such setting, the pusher 322 only can move between the actual move-up position PB and the lower position P3.

Thus, this invention can shorten the moving distance and time of the pusher 322, depending on the highest point 93 of every working object 90.

There are many modified ways to detect the working object 90 vertically (or vertically plus horizontally). Such modification is still within the scope of this invention.

The advantages and functions of this invention can be summarized as follows.

[1] It can shorten the horizontal moving time of the horizontal moving portion. The horizontal moving portion of the traditional one only can be moved between the first end and the second end repeatedly. However, this invention contains the first detector for detecting the working object during the horizontal moving process. Also, this invention can reset and adjust the horizontal moving range between the actual pushing position and the front end. Therefore, it will save the time of moving process between the rear end and the actual pushing position (actually, it does not push the working object during this process).

[2] It can shorten the vertical moving time of the vertical moving portion. Similarly, the vertical moving portion of the traditional one only can be moved between the upper position and the lower position repeatedly. However, this invention contains the second detector for detecting the working object's height during the vertical moving process. Also, this invention can reset and adjust the vertical moving range between the actual move-up position and the lower position. Therefore, it will save the time of moving process above the highest point of the working object (wasting time is avoided).

[3] It can increase the total processing efficiency. Because this invention can detect the actual working object's length and its highest point, the horizontal moving distance and the vertical moving distance of the driving system can be shortened. Hence, the total processing efficiency can be increased.

While the invention has been described in terms of preferred embodiments, those skilled in the art will recognize that the invention can be practiced with modifications within the scope of the appended claims.

What is claimed is:

1. A pusher system for a strapping machine, comprising:
  a housing having a first end, a second end, and a guiding channel, wherein said guiding channel is disposed between said first end and said second end;
  a pair of conveyors disposed on said housing, said guiding channel being positioned between said conveyors for allowing a working object to be moved on said conveyors; said working object having a bottom that has a front edge and a rear edge, a length of said working object being defined between said front end and said rear end; and
  a driving system mounted in said housing and corresponding to said guiding channel, said driving system having a horizontal moving portion and a vertical moving portion, said horizontal moving portion being able to move between a first position and a second position horizontally, said vertical moving portion being mounted on said horizontal moving portion and is able to move up or down, said vertical moving portion including a pusher for pushing said working object moving forward;
  wherein said pusher system for a strapping machine further comprising a first detector and a controller; said first detector being disposed on a top surface of said pusher and said first detector connecting with said controller electrically;
  so that as said horizontal moving portion moves from said second position toward said first position, when said first detector detects said rear edge of said working object, said controller is able to stop said horizontal moving portion and to set an actual pushing position; so as to reset that said horizontal moving portion only moving between said actual pushing position and said second position for shortening a moving time and a moving distance of said horizontal moving portion;
  wherein
  said vertical moving portion of said driving system includes a vertical rail so that said pusher can move up or down along said vertical rail;
  said driving system further comprising a horizontal driving portion and a vertical driving portion;
  said horizontal driving portion including:
    a horizontal power device having a motor, a power chain gear, and an auxiliary chain gear, said motor connecting with said controller electrically and being able to drive said power chain gear;
    a chain disposed on said power chain gear and said auxiliary chain gear, said horizontal moving portion being secured on said chain;
  so that said controller can control said motor to drive said chain moving and make said horizontal moving portion being movable among said first position, said second position and said actual position; and said vertical driving portion including:
- a power cylinder and a protruding rod; said power cylinder connecting with said controller electrically, said protruding rod having two ends, one end of said protruding rod being disposed inside said power cylinder, the other end of said protruding rod being connected with said pusher;
- so that said controller can control said power cylinder to make the protruding rod in or out so as to make said pusher moving up or down on said horizontal moving portion.

2. The pusher system for a strapping machine as claimed in claim 1, wherein said driving system further comprising:
- a second detector connecting with said controller electrically and being disposed on said pusher, said second detector being able to detect a direction forward said working object and being secured on said pusher;
- said working object has a highest point;
- so that as said horizontal moving portion moving to said actual pushing position, during a move-up process of said pusher from a lower position, when said second detect detecting that it just moves above said highest point of said working object, said controller being able to stop said pusher and to set an actual move-up position; so as to reset that said pusher only can move between said lower position and said actual move-up position for shortening a moving time and a moving distance of said pusher.

* * * * *